Oct. 9, 1962          L. C. KEENE          3,058,052
PHASELESS AUTOMATIC CONTROL SYSTEM
Filed April 12, 1960          2 Sheets-Sheet 1
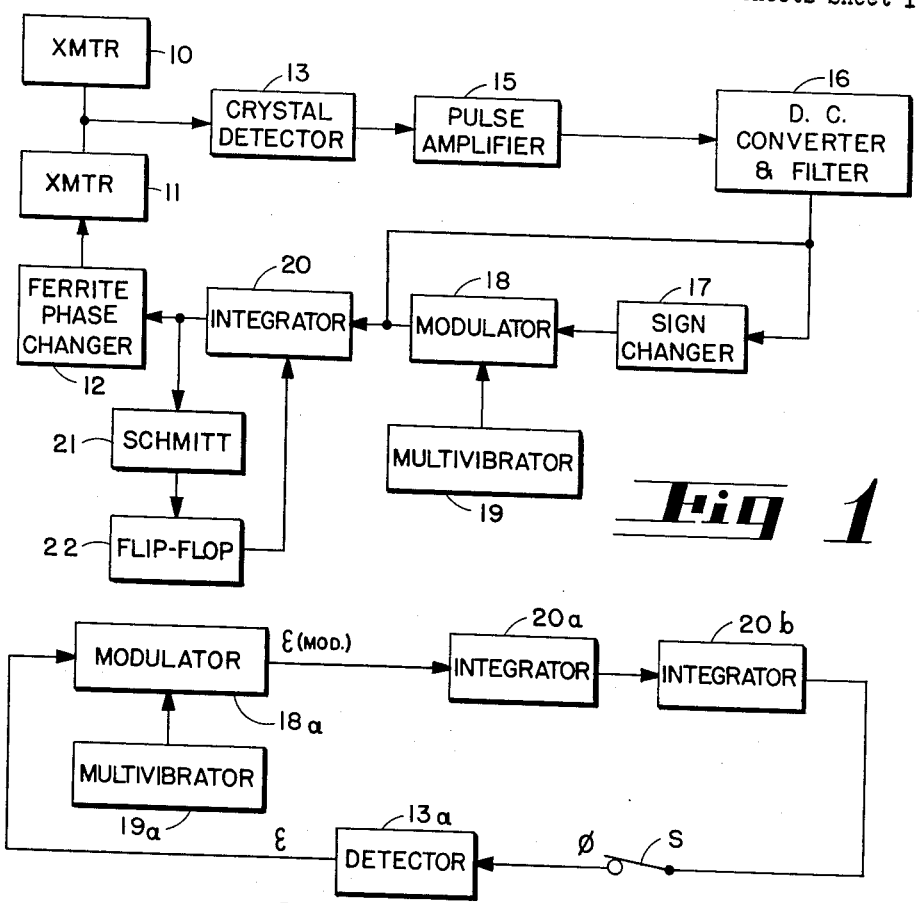
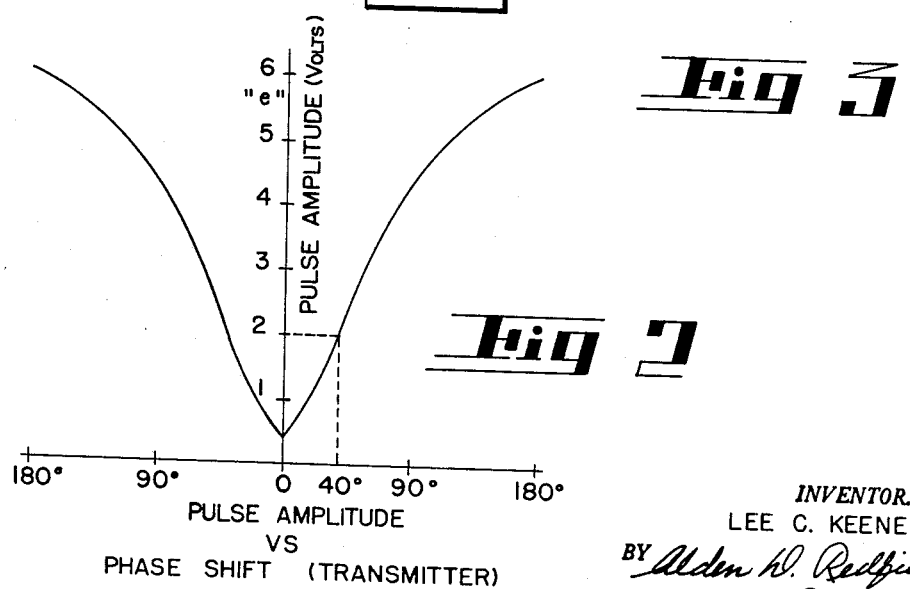
INVENTOR.
LEE C. KEENE.
BY
ATTORNEYS.

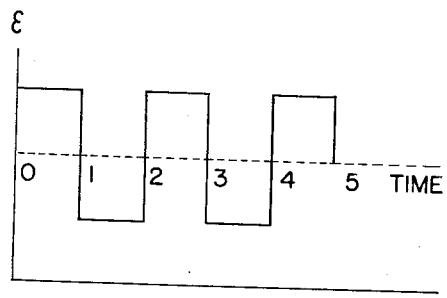
A
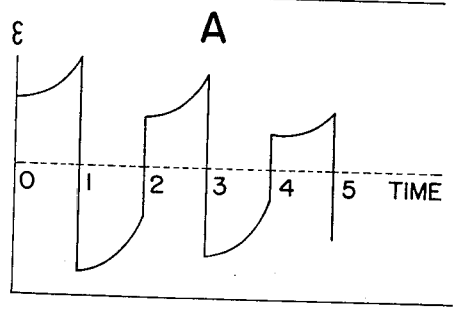
C
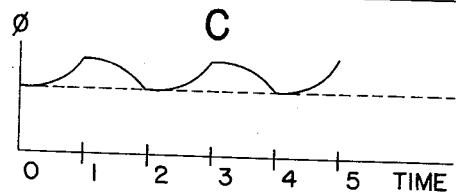
B
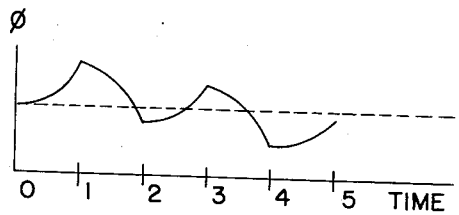
D
Fig. 4
INVENTOR.
LEE C. KEENE.

United States Patent Office 3,058,052
Patented Oct. 9, 1962

3,058,052
PHASELESS AUTOMATIC CONTROL SYSTEM
Lee C. Keene, Tulsa, Okla., assignor to Avco Manufacturing Corporation, Cincinnati, Ohio, a corporation of Delaware
Filed Apr. 12, 1960, Ser. No. 21,670
5 Claims. (Cl. 323—101)

This invention relates to an automatic electronic null-seeking servo system operable on source magnitude data and not requiring direction or phase information.

In many applications an error-in-phase is detected as a difference in amplitude having no phase or direction information. This invention provides a system for processing the error signal in such a manner that the system automatically seeks a null, irrespective of the direction of the error. In general, I accomplish this result by modulating the error signal so as to alternately change its polarity, and then by double-integrating it with respect to time. As will be seen, if the error signal is then applied to a phase-correcting element, the phase will be continuously adjusted toward an absolute in-phase or null condition.

As described in this specification, my invention is applied to a transmitting system which obtains its required power by adding two or more relatively low power sources. As will be understood by persons skilled in the art, the full advantage of such additions of power is realized only when the power sources are in phase. My invention utilizes a sensitive error-in-phase detector which yields voltage pulses of increased magnitude when the power sources are out of phase. The phase of the transmitters is controlled by a phase-correction device which, in turn, is driven by the error signal. The error signal is modulated so as to provide alternately a positive and a negative signal. The modulated error signal is then double-integrated, with respect to time, to provide a voltage drive for the phase-correction device. The drive always automatically seeks an in-phase condition.

An object of this invention is to produce a null-seeking servo system in which an error-in-phase is detected as a magnitude error only.

Another object of this invention is to provide an automatic servo system for maintaining two power sources in phase wherein the error-in-phase is detected as a magnitude signal only, and wherein means are provided for alternately changing the polarity of said error signals and sensing the direction which produces improved phase relationship between the power sources.

Still another object of this invention is to provide a closed loop servo system in which the error signal contains magnitude information only and wherein the error signal is modulated alternately in a positive and in a negative direction and then double-integrated with respect to time to effect a directional, null-seeking control.

Another object of this invention is to provide a servo system in which the error signal is modulated by an alternating voltage and then double-integrated with respect to time.

For further objects and for a more complete understanding of the precise nature of this invention, reference should now be made to the following specification and to the accompanying drawings, in which:

FIG. 1 is a block diagram representing a preferred embodiment of my invention;

FIG. 2 is a curve depicting a representative output from the detector as used in FIG. 1;

FIG. 3 is a simplified block diagram demonstrating the nature of operation of this invention; and FIG. 4 is a series of curves for illustrating the operation of this invention.

Referring to FIG. 1 of the drawings, my invention is used in conjunction with two transmitters 10 and 11, the object being to maintain the output of the two transmitters in phase so as to obtain the highest efficiency when the outputs are added for transmission. In the event that the transmitter 11 leads or lags in phase, I provide a ferrite phase changer 12 in the control network of the transmitter 11 for adjusting the phase of that transmitter in the proper correcting direction. A phase difference or error-in-phase can be detected by means of a crystal detector 13, the output of which will be at zero or minimum magnitude when the outputs of the transmitters 10 and 11 are in phase, and which will increase in magnitude when the outputs of the transmitters 10 and 11 are out of phase. The output response curve of the detector 13 is depicted in FIG. 2.

It will be observed that the output of the crystal detector 13 contains magnitude information only and does not contain direction information. That is to say, whether the transmitter 10 leads or lags the transmitter 11, the output from the detector 13 will always be in a positive direction. Now it may be possible in certain applications to provide a detector which will yield direction information; however, in power-adding systems of the type illustrated, this is difficult to do and, at best, adds considerable expense to the system. By means of this invention I process the output from the crystal detector 13 in such a way that, when applied to the ferrite phase changer 12 as a control, the transmitter 11 is always adjusted in a direction seeking an in-phase condition.

The output from a crystal detector 13, which is a pulsating D.-C. voltage, is first amplified in a pulse amplifier 15 and is then applied to a D.-C. converter and filter 16 for the purpose of reducing the pulsating component and providing a smooth direct current varying in amplitude proportional to the phase error. One portion of the direct current output of the D.-C. converter and filter 16 is applied directly to the input of an integrator 20, while the remaining portion is applied to a sign changer 17. The output of the sign changer 17 is then modulated in a modulator 18 with the output of a multivibrator 19 for the purpose of alternately switching the sign changer output on and off. Combining the outputs of the D.-C. converter and filter 16 and the modulator 18 has the effect of producing an error signal which changes polarity with respect to the average error at a predetermined rate. The combined outputs from the modulator 18 and the D.-C. converter and filter 16 are then applied to the input of the integrator 20, and the output from the integrator 20 is applied to the ferrite phase changer 12, which serves to adjust the phase of the transmitter 11. In addition, because of the ratio of the inductance of the phase changer to its resistance, the phase changer 12 also provides a time lag. As will be seen, this time lag is the equivalent of a second integration in a closed loop servo. A portion of the output of the integrator 20 is used to energize a Schmitt trigger circuit 21 which actuates a flip-flop circuit 22 for reversing the output of the integrator 20 when a predetermined phase error exists in either direction. The purpose of the Schmitt trigger 21 and flip-flop circuit 22 is to detect the positive or negative voltage levels from the integrator and reverse the polarity. In actual practice, the polarity of the integrator output was reversed from +190 degrees to −160 degrees and vice versa because of the limitations in operation of the phase changer. Depending on the particular phase changer employed, this circuitry may not be used and is not considered a fundamental part of this invention.

The operation of FIG. 1 will be understood more readily by reference to the simplified block diagram of FIG. 3 which is provided for the purpose of demonstrating the functions of the various portions of the system. In FIG. 3 the detector 13a is assumed to have a pure D.-C. response in accordance with the characteristics of the curve illustrated in FIG. 2. In essence, this corresponds with the theoretical output of the D.-C. converter and filter 16. The direct current output from the detector 13a is applied to the input of a modulator 18a where, for this example, it is multiplied with the output from the multivibrator 19a so as to alternately change the polarity of the output of the detector at the rate of the multivibrator action. With the switch S as shown in a closed position, the output from the modulator 18a is applied to an integrator 20a and then to an integrator 20b, and the output from the integrator 20b is applied to the input of the detector 13a.

To explain the operation of the system as shown in FIG. 3, consider that the switch S is moved to an open position and assume that a given phase error $\phi$ exists so that a given voltage is derived from the output of the second integrator 20b. If the assumed phase error is 40 degrees, then the output from the second integrator 20b, when applied to the detector 13a, will produce an error output of 2 volts, as indicated by the curve in FIG. 2. The 2-volt error signal is then modulated in the modulator 18a with the square wave output of the multivibrator 19a, with the result that the error signal is alternately changed in polarity at a rate equal to the frequency of the multivibrator 19a. That is to say, assuming a given phase error $\phi$, the output from the modulator 18 with the servo loop broken at the switch S will be a square wave having an amplitude proportional to the error signal $\epsilon$.

It is known that if a square wave, such as illustrated by the curve A in FIG. 4, is double-integrated with respect to time, a wave form results, such as illustrated by the curve B in FIG. 4. Since the curve A represents the error signal, the curve B, which is the double integration of the error signal, represents the phase error $\phi$ with the switch S open.

If the switch S is moved into a closed position at time $T=0$, the double integration will cause the system to seek a null; that is, the phase error $\phi$ will be reduced to zero. With switch S closed at time $T=0$, the modulator error signal $\epsilon$ will not have a flat-top response, but instead will increase as the phase changes (see the curve C in FIG. 4), causing the phase shift to increase until time $T=1$ in accordance with the curve D in FIG. 4. Now the polarity of the error signal reverses at time $T=1$ and at that same time the phase error $\phi$ begins to decrease. Note that in the curve C the error at time $T=1$ is larger in the reverse polarity than it was at time $T=0$ in the original polarity. However, during the interval from time $T=1$ to time $T=2$ the double integration of the error voltage will produce an appropriately larger decrease in the phase error $\phi$, and thus the phase error at time $T=2$ will be less than the 40-degree error at time $T=0$ when the switch S is closed.

At time $T=2$ the polarity of the error is again reversed, and it will be seen that the error is less than at time $T=0$. During the period from time $T=2$ to time $T=3$ the integration starts at a lower level and the phase shift amplitude is increased to a point which is less than at time $T=1$. This progressive change in the integrator square wave tends to approach zero difference at a rate depending upon the frequency and gain of the system.

The system illustrated in FIG. 1 incorporates the principles of the operation just described in connection with FIG. 3. The embodiment of FIG. 1 is a closed loop servo system and in such systems, from servo theory, oscillations would result unless a damping signal is introduced. The standard technique for obtaining a damping signal in a normal second order servo system is to feed back a velocity signal which is equivalent to a time lag circuit. Consequently, in FIG. 1, instead of using a double integration, the same 180-degree phase shift is accomplished by a single integration and a simple time lag. The integrator 20 provides one required integrating function, while the ferrite phase shifter provides the time lag with time constant determined by the ratio of the inductance of the phase changer to its resistance.

Thus, in FIG. 1 the output from the modulator 18 is represented by the curve C of FIG. 4, while the power output from crystal detector 13 is represented by the curve D of FIG. 4, and it will be recognized that the processed error signal applied to the ferrite phase changer 12 will alter the phase of the transmitter 11 so as to produce a null output.

In setting up the servo system described herein, the gains and frequencies must be adjusted to provide damping between 0.5 and 0.7, and the modulation frequency must be in the order of ten times the natural frequency of the second order system to obtain optimum stable performance. Analysis of the system indicates that an ideal multi-vibrator frequency is ten cycles per second with a loop gain in the vicinity of forty, the gain of forty being equivalent to a natural frequency of one cycle per second for a second order servo system. Additional time lags out of the frequency range do not appreciably affect the performance.

While this invention was reduced to practice and is described herein in connection with an error-in-phase detector which yields magnitude data only, it is clear that the principles apply equally well to systems in which a directional error is readily available. That is to say, if the output from the detector 13 obtains direction information, the operation of the servo loop will be identical with that disclosed. While in such a system the unique processing of the error signals for the purpose of seeking a null is not necessary, several advantageous results are achieved. For example, if the error-correcting device is a motor, the oscillations at the null will result in a slight dither tending to eliminate starting friction and, in addition, a more accurate null will be obtained since the system will automatically oscillate equally about both sides of the null, even at very low power levels.

It is my intention, therefore, that this invention be limited only by the appended claims as interpreted in the light of the prior art.

What is claimed is:

1. In a servo system, the combination comprising: an error detector for producing a direct voltage error signal of a given polarity in response to any deviation from a predetermined condition; means for continuously changing the polarity of said error signal; means for double-integrating said error signal; and adjusting means for eliminating said deviation, said adjusting means being controlled by integrated error signal.

2. In a servo system, the combination comprising: an error detector for producing a direct voltage error signal in response to a deviation from a predetermined condition; a source of alternating currents; means for modulating said error signal with said alternating currents; means for double-integrating said modulated direct voltage error signal; and correcting means for correcting said deviation, said correcting means being controlled by said modulated double-integrated error signal.

3. In a system for controlling the phase relationship of a first source of energy with respect to a second source of energy, the combination comprising: a detector for comparing the phase of said first source with the phase of said second source and for producing a pulsating error signal of a given polarity when said sources are out of phase; means for amplifying said pulsating error signal; means for converting said pulsating error signal to a smoothed direct voltage error signal; a source of alternating current voltages; means for modulating said direct voltage error signal with said alternating current voltages; means for integrating and delaying said modulated error signal; and adjusting means for adjusting the phase of one of said transmitters, said adjusting means being controlled by said integrated and delayed error signal.

4. In a servo system for automatically maintaining two sources of energy in a predetermined phase relationship, the method comprising the steps of: deriving a direct voltage error signal in response to a deviation from said predetermined phase relationship; modulating said error signal to produce an error signal of continuously changing polarity; double-integrating said modulated error signal; and adjusting said phase relationship in accordance with said modulated, double-integrated error signal, whereby said deviation is eliminated.

5. In a servo system for automatically maintaining first and second sources of energy in a predetermined phase relationship, the combination comprising: phase-adjusting means for adjusting the phase of said first source with respect to said second source; a detector for producing a direct current error signal having a magnitude proportional to the magnitude of the deviation in phase from said predetermined phase relationship, said detector producing an error signal of a given polarity irrespective of the instantaneous leading or lagging relationship of said first source with respect to said second source; means for alternately changing the polarity of said error signal; and means for double-integrating said error signal, said double-integrated error signal controlling said phase-adjusting means, whereby said predetermined phase relationship of said sources is maintained fixed.

References Cited in the file of this patent

UNITED STATES PATENTS 2,940,028     Parzen ---------------- June 7, 1960